UNITED STATES PATENT OFFICE.

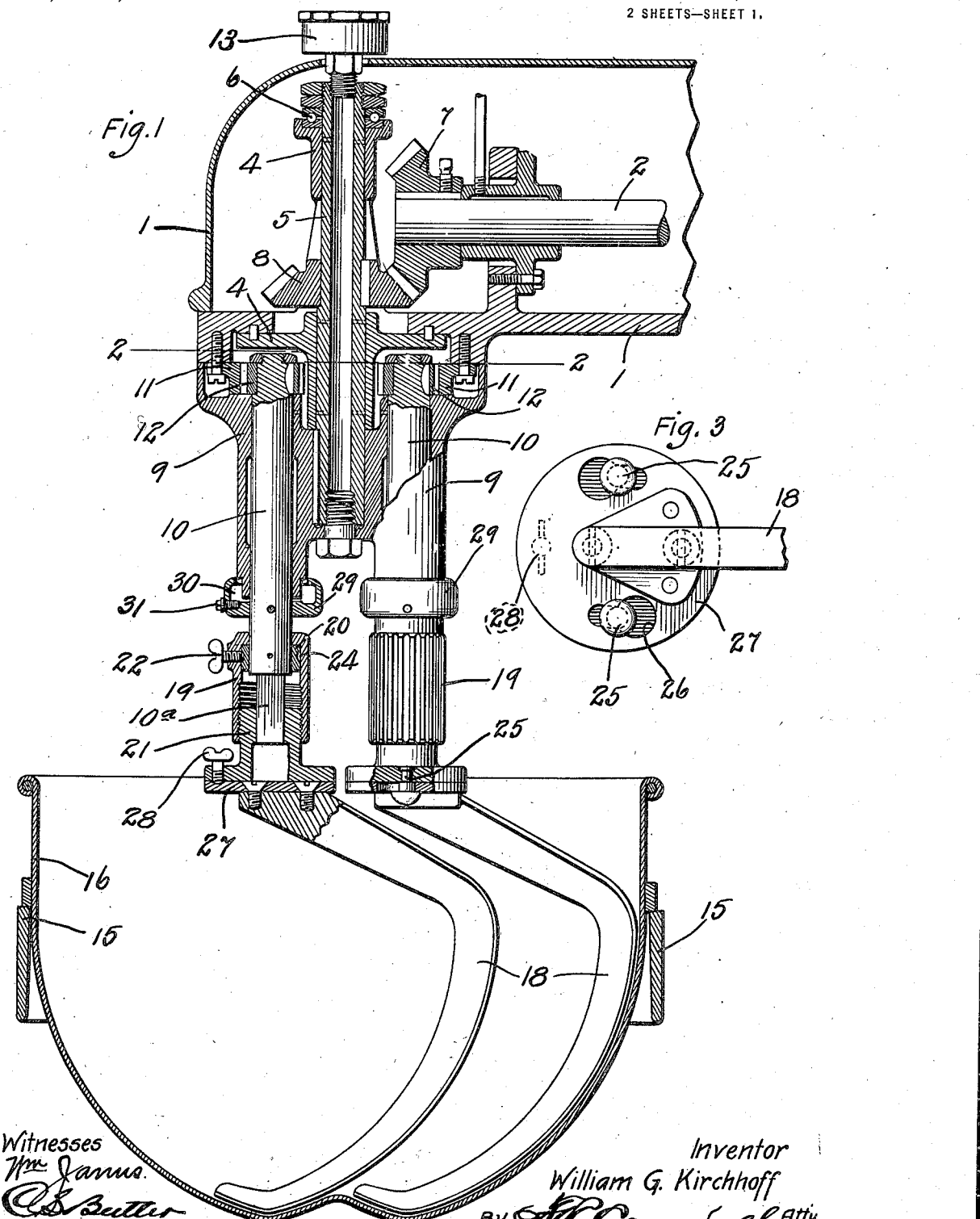

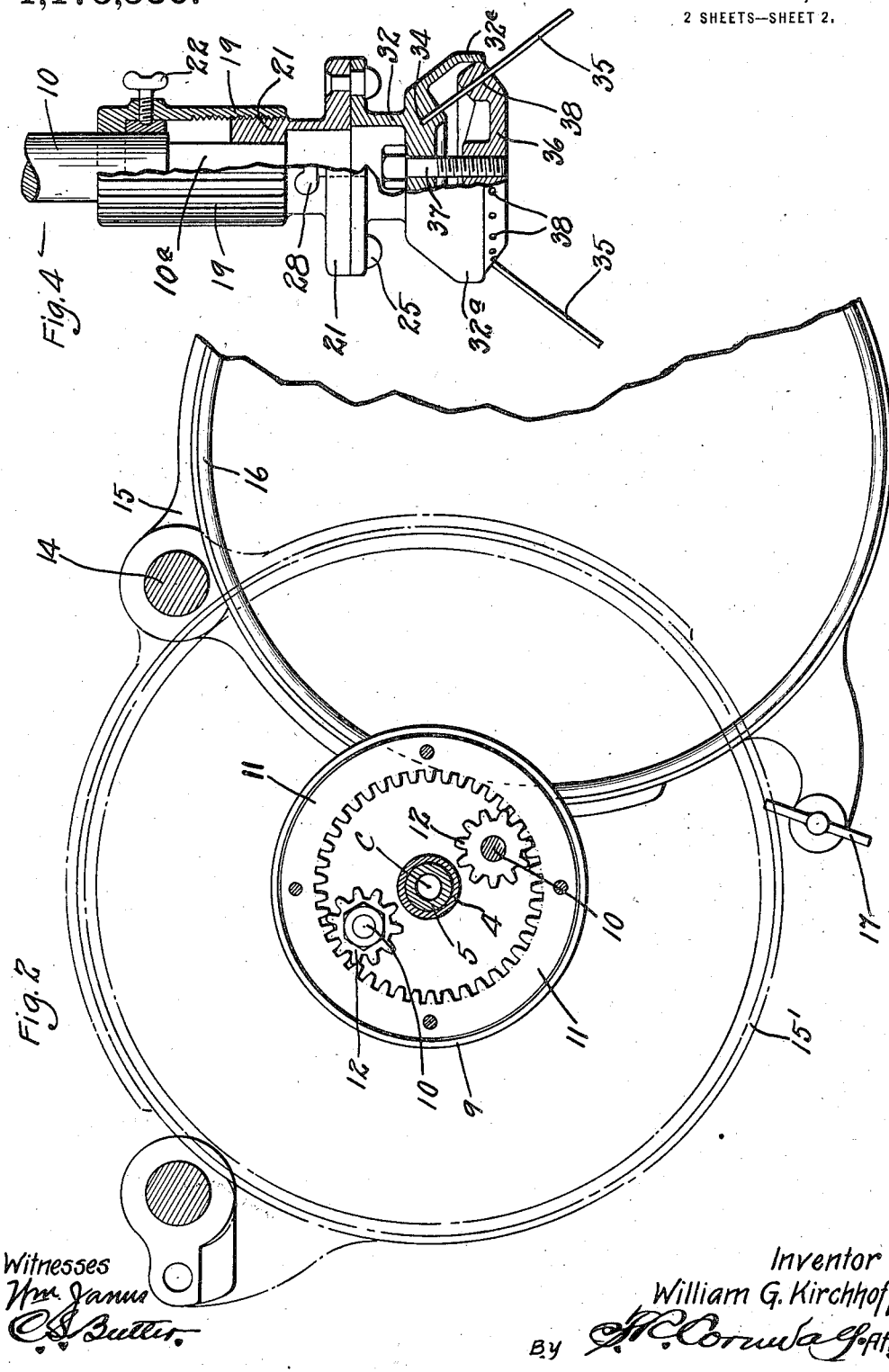

WILLIAM G. KIRCHHOFF, OF ST. LOUIS, MISSOURI, ASSIGNOR TO AMERICAN BAKERS MACHINERY COMPANY, OF ST. LOUIS, MISSOURI, A CORPORATION OF MISSOURI.

CAKE-MIXER.

1,175,530.  Specification of Letters Patent.  Patented Mar. 14, 1916.

Application filed April 28, 1913. Serial No. 764,047.

*To all whom it may concern:*

Be it known that I, WILLIAM G. KIRCHHOFF, a citizen of the United States, residing at St. Louis, Missouri, have invented a certain new and useful Improvement in Cake-Mixers, of which the following is a full, clear, and exact description, such as will enable others skilled in the art to which it appertains to make and use the same, reference being had to the accompanying drawings, forming part of this specification, in which—

Figure 1 is an elevation of my improved cake mixer partly in section. Fig. 2 is a plan view in section on line 2—2 of Fig. 1. Fig. 3 is an enlarged detail showing a bottom view of the beater attaching means. Fig. 4 is a detail showing an improved form of whip attaching means.

My invention relates broadly to bakers' machinery, and specifically to an improved device known as a cake mixer, designed for the mixing of batters, dough, and similar substances.

The principal objects of my invention are, to facilitate the removal of the bowl containing the mixed substance from the machine, and to provide a means for adjusting the beaters relative to the mixing bowl.

Another object of my invention is to provide a means whereby the beaters may be detached readily from their operating devices so as to facilitate the removal of the bowl.

Another object of my invention is to provide means for protecting the mixture in the bowl from oil or other foreign matter which may be on the operating mechanism.

A further object of my invention is to provide an improved attaching means for the stirring members.

A still further object of my invention is to provide an improved mounting for a beating instrument known as a whip which is used for frothing up eggs, and similar purposes.

Other and further objects of my invention will be obvious, or hereinafter pointed out.

By reference to the drawings it will be understood that my invention contemplates a suitable support or casing 1, upon which is mounted a driving shaft 2, the operation of which may be controlled from any suitable clutch and change-speed mechanism. The casing or support 1 carries bearings 4, in which is journaled a vertical shaft 5. This shaft is provided with suitable thrust bearings 6 at its upper end. The driving shaft 2 carries pinion 7, which is adapted to actuate the shaft 5 through coöperating pinion 8 carried thereon. Carried by shaft 5 and secured to rotate therewith is the header 9. This header is a bifurcated arrangement in which are journaled similar beater shafts 10 disposed vertically, and parallel to each other. Mounted on support 1 is an annular gear 11, and keyed on the upper ends of beater shafts 10 are pinions 12 which mesh with annular gear 11. Consequently, when header 9 is rotated by shaft 5, beater shafts 10, while being revolved about center C will also be rotated on their own axes by virtue of the coöperation of pinions 12 with annular gear 11.

Pivoted on a suitable support 14 is the bowl ring 15, in which is seated the mixing bowl 16. By virtue of its pivotal mounting bowl ring 15 is adapted to be swung under header 9, as indicated by dotted lines 15' in Fig. 2, in which position it may be secured by suitable securing means 17. When it is desired to remove the bowl from the ring it may be swung outwardly to the position as indicated in solid lines in Fig. 2, in which position the bowl may be removed from the ring, it being clear of header 9 and the parts carried thereby.

By a suitable novel mechanism, beaters 18 are secured to rotate with beater shafts 10 and to coöperate with bowl 16 in the mixing operation. In order to secure proper coöperation of beaters 18 with the sides of the bowl, it is necessary that they be adjustable with reference to the bowl, and in order to swing the bowl out into clear position, it is necessary that the beaters be capable of quick and easy detachment from their mountings. The mechanism now to be described is adapted to secure these desirable results.

The lower ends of beater shafts 10 are milled down square, as shown at $10^a$. Mounted to rotate on each of beater shafts 10 is a hand nut 19 in the form of a sleeve, each secured on its respective shaft by a collar 20 secured to the shaft. Mounted to slide vertically on the milled portion $10^a$ of each beater shaft 10 is foot member 21. Hand nut 19 and foot member 21 are provided with coöperating threads, so that when hand nut 19 is rotated foot member 21 will be moved upward or downward on milled portion 10ᵃ of its beater shaft 10. Vertical displacement of hand nut 19 is prevented by the engagement of wing thumb screw 22 in an annular groove 24 provided in collar 20, and when the proper adjustment of foot member 21 is secured, the parts will be held in proper position by the tightening of wing thumb screw 22 to prevent rotation of hand nut 19.

Foot members 21 are provided with pins 25 which are adapted to coöperate with pin slots 26 in the beater supports 27, to which the beaters 18 are secured. The beaters are secured to the beater shafts 10 by inserting pins 25 in the enlarged portions of pin slots 26, and then rotating the beaters so as to move the smaller portions of pin slots 26 into engagement with pins 25 under the heads of such pins. The beater supports are held in this position by suitable screws 28 which prevent the movement of beater supports 27 relative to foot members 21.

The beaters may be quickly and readily detached from beater shafts 10 by loosening the screws 28 and then rotating the beater supports 27 or reversely rotating beater shafts 10 so as to disengage pins 25 from the narrow portions of slots 26, and then by freeing hand nuts 19 and then rotating them to retract foot members 21 upwardly away from the beaters. This upward movement of foot members 21 also elevates them clear of bowl 16 so that the same may be swung clear, as above described. The upward and downward movement of foot members 21, as just described, also serves to adjust beaters 18 relative to the sides and bottom of bowl 16.

Seated on beater shafts 10 below the lower extremities of header 9 are oil collars 29. Each of these is formed with an annular interior chamber-like portion which may be tapped from the outward by an aperture closed by tap screw 31. Any oil which may run down beater shafts 10 is caught by these oil collars 29 and held in the chambers 30 until removed through the taps. This prevents any oil running down into the mixing bowl while the device is in operation.

For the purpose of whipping eggs or cream a special form of mounting is provided, as illustrated in Fig. 4. This mounting comprises the support member 32 which is provided with concentrically disposed seats 34 adapted to receive the ends of the whips 35. The support 32 has a depending skirt portion 32ᵃ, within which fits a clamping disk 36. This is secured to the support 32 by a suitable screw 37, by which it may be drawn up within the skirt portion 32ᵃ. Clamping disk 36 is provided with concentrically arranged channels 38, through which the whips 35 pass, the whips are inserted through channels 38 and their ends seated in seats 34. The screw 37 is then tightened to draw the clamping disk 36 upwardly, which tends to move channels 38 and seats 34 out of alinement, with the result that the whips 35 are tightly clamped in the mounting.

Having thus shown and described one form thereof, I claim as my invention the following, with the understanding that as set out in the following claims, my invention is to be construed as comprehending not only the specific form shown, but all modifications thereof within the scope of mechanical skill.

1. In a mixing machine, the combination of a beater shaft, means for actuating it to give a stirring movement, a sleeve member revolubly mounted adjacent the extremity of said shaft, a foot member slidable on the shaft and secured for rotation therewith, said foot member having a portion movable within the said sleeve and having screw-thread engagement therewith, and means for securing a stirring blade to said foot member.

2. In a machine of the class described, a beater shaft, a sleeve member and a foot member telescopically mounted thereon, the former being revoluble on the shaft and the latter being held for rotation with the shaft, said sleeve member and said foot member having adjustable interengagement, and means for securing a stirring blade to the foot member.

3. In a machine of the class described, a rotatable beater shaft, a foot member thereon, a beater including a supporting part in the form of a plate adapted to fit against the foot member, said foot member and said supporting plate being provided with inter-engaging portions disposed non-axially of the shaft and releasable by relative rotation of the beater and the shaft, and adjustable means for holding said parts against relative rotation.

In testimony whereof I hereunto affix my signature in the presence of two witnesses, this 19th day of April, 1913.

WILLIAM G. KIRCHHOFF.

Witnesses:
  M. P. SMITH,
  C. S. BUTLER.